US009760955B2

(12) United States Patent
Soni

(10) Patent No.: US 9,760,955 B2
(45) Date of Patent: Sep. 12, 2017

(54) SYSTEM, METHODS AND DEVICES FOR ORGANIZING USER EVENTS AND USER GROUPS

(71) Applicant: Sumir Singh Soni, Chagrin Falls, OH (US)

(72) Inventor: Sumir Singh Soni, Chagrin Falls, OH (US)

(73) Assignee: Sumir Soni

( * ) Notice: Subject to any disclaimer, the term of this patent is extended or adjusted under 35 U.S.C. 154(b) by 261 days.

(21) Appl. No.: 14/542,620

(22) Filed: Nov. 16, 2014

(65) Prior Publication Data
US 2016/0136525 A1    May 19, 2016

(51) Int. Cl.
| | |
|---|---|
| A63F 13/00 | (2014.01) |
| G06Q 50/00 | (2012.01) |
| G06Q 10/06 | (2012.01) |
| G06F 9/54 | (2006.01) |
| H04W 4/08 | (2009.01) |
| G06F 17/30 | (2006.01) |

(52) U.S. Cl.
CPC .......... *G06Q 50/01* (2013.01); *G06F 9/542* (2013.01); *G06F 17/30781* (2013.01); *G06Q 10/06311* (2013.01); *H04W 4/08* (2013.01)

(58) Field of Classification Search
None
See application file for complete search history.

(56) References Cited

U.S. PATENT DOCUMENTS

| | | | |
|---|---|---|---|
| 8,027,943 B2 * | 9/2011 | Juan ................. | G06Q 10/10 705/319 |
| 2005/0165762 A1 * | 7/2005 | Bishop ............... | G06Q 30/02 |
| 2008/0162157 A1 * | 7/2008 | Daniluk ............. | G06Q 99/00 705/1.1 |
| 2011/0276396 A1 * | 11/2011 | Rathod ............. | G06F 17/30867 705/14.49 |
| 2014/0365484 A1 * | 12/2014 | Freeman ........... | G06Q 50/01 707/736 |

\* cited by examiner

*Primary Examiner* — Sunit Pandya

(57) ABSTRACT

Disclosed herein are systems and methods for organizing user events. A non-limiting example embodiment of a disclosed system comprises a creation component, a generation component, a ranking component, a permission component, and a notification component. In an aspect, a creation component creates a set of user profiles based on a set of user inputs, wherein the set of user inputs are received at a user interface. In another aspect, disclosed is a generation component that generates a group event comprising a subset of candidate user profiles of the set of user profiles based on a set of grouping criteria.

16 Claims, 10 Drawing Sheets

SYSTEM, METHODS AND DEVICES FOR ORGANIZING USER EVENTS AND USER GROUPS

TECHNICAL FIELD

This disclosure relates to systems, methods and devices for facilitating organizing user events and user groups.

BACKGROUND

Sports have always been a group activity by which a group of individuals gather together to compete against one another or against teams of people. The social element of assembling sporting events facilitates cooperation, camaraderie, competition, and friendship. However, the traditional mechanisms of organizing sporting events provide many difficulties to organizing sporting events. Conventionally, organizing sporting events occurs among groups of people whom know one another and via word of mouth. Often communication between strangers or making others aware of a users desire to compete an event does not occur unless an individual has contact information of another individual. For instance, an individual who wants to participate in an athletic event at a given time and within a given location will likely call a group of close friends to compete and if such organization fails the individual will have exhausted his options. Given the issues related to organizing group events, there is a need for a technology that provides a solution to such issues.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope of particular embodiments of the disclosure, or any scope of the claims. Its sole purpose is to present some concepts of the disclosure in a simplified form as a prelude to the more detailed description that is presented later.

In accordance with one or more embodiments and corresponding disclosure, various non-limiting aspects are described in connection with systems and methods for generating and subscribing to group events. In an embodiment, a system is provided comprising a memory that stores executable components; and a processor, coupled to the memory, that executes the executable components to perform operations of the system, the executable components comprising: a creation component, a generation component, a ranking component, a permission component, and a notification component.

In an aspect, a creation component creates a set of user profiles based on a set of user inputs, wherein the set of user inputs are received at a user interface. Furthermore, a generation component generates a group event comprising a subset of candidate user profiles of the set of user profiles based on a set of grouping criteria. In another aspect, a ranking component ranks each user profile of the subset of candidate user profiles candidacy for admission to the group event based on a set of ranking data. In yet another aspect, a permission component permits a first subset of user profiles of the subset of candidate user profiles to subscribe to the group event based on a set of user preferences. Furthermore, in an aspect, a notification component provides a notification to a first user profile of the set of user profiles, and wherein the notification represents a recommendation of a set of group events.

In yet another aspect, the system can employ an assignment component that facilitates a first user profile of the set of user profiles to assign a rating to a second user profile of the set of user profiles based on at least one of a skill level, a level of cooperative ability, a level of leadership ability, or a level of positional competency. Also, the system can employ a sharing component that facilitates a user profile of the first subset of user profiles to share a set of media items comprising at least one of an image item, an audio item, or a video item. In another aspect, the system can employ an invitation component that invites a user profile to join the group or the group event based on a user preference of the set of user preferences.

In another embodiment, a method is provided comprising creating, by a system comprising a processor, a set of user profiles based on a set of user inputs are received at a user interface. In an aspect, the method can comprise generating, by the system, a group event or a group comprising a subset of candidate user profiles of the set of user profiles based on a set of grouping criteria. Furthermore, the method can comprise ranking, by the system, each user profile of the set of user profiles candidacy for admission to the group event or the group based on a set of ranking data. Also, in an aspect, the method can comprise permitting, by the system, a first subset of user profiles of the subset of candidate user profiles to subscribe to the group event based on a set of grouping criteria. In another aspect, the method can comprise rejecting a second subset of user profiles of the subset of candidate user profiles to subscribe to the group event based on the set of user preferences. In yet another aspect, the method can comprise, notifying, by the system, a subset of user profiles of a set of details associated with the group event.

The following description and the annexed drawings set forth certain illustrative aspects of the disclosure. These aspects are indicative, however, of but a few of the various ways in which the principles of the disclosure may be employed. Other aspects of the disclosure will become apparent from the following detailed description of the disclosure when considered in conjunction with the drawings.

DETAILED DESCRIPTION

Overview

Figure 1:
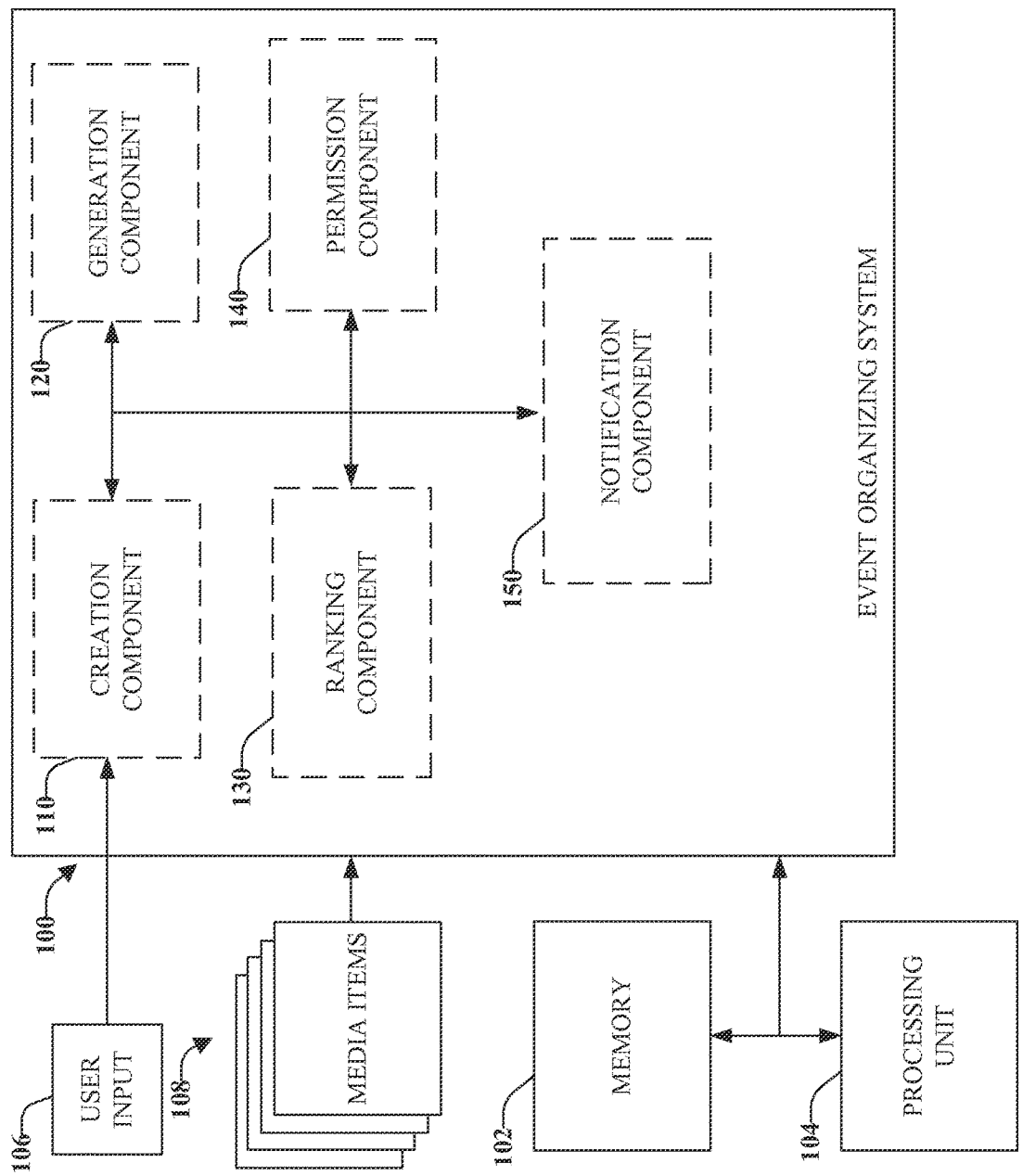
FIG. 1 illustrates an example non-limiting system for organizing user events and user groups.

The various embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and components are shown in block diagram form in order to facilitate describing the various embodiments.

By way of introduction, this disclosure relates to systems, methods, and devices for organizing group events and groups. In particular, the systems and methods disclosed herein describe a system that facilitates the ability of users to organize events such as sporting events and communicate with other users to organize such events. Furthermore, in an aspect, the system facilitates the tracking of user skill levels and provides users the capability to review various qualities, characteristics and attributes of other users via rating systems. In another aspect, the system facilitates the determination and quantification of user skill level as pertains to various group events or group events. For instance, a user can be rated on skill level, attendance track record, preparedness, cooperative proclivities, and other such rating criteria.

Also, the system provides for a notification system that provides recommendations to users of group events or groups of interest to the user for subscription. Overall, the systems disclosed herein enables users to create events, communicate the event to other users, identify users within a geographic proximity to the group event, facilitate identification of candidates to attend the group events, facilitate correspondence amongst users, and facilitate group event management by a user or group of user.

Example Embodiments of Systems, Methods and Devices for Organizing User Events and User Groups Disclosed herein are systems and methods for organizing user events and user groups. Referring initially to FIG. 1, illustrated is system 100 for organizing user events. The system 100 comprises a memory 102 that stores executable components; and a processor 104, coupled to the memory 102, that executes or facilitates execution of the executable components to perform operations of the system, the executable components comprising: a creation component 110 that creates a set of user profiles based on a set of user inputs 106, wherein the set of user inputs 106 are received at a user interface; a generation component 120 that generates a group event comprising a subset of candidate user profiles of the set of user profiles based on a set of grouping criteria; a ranking component 130 that ranks each user profile of the subset of candidate user profiles candidacy for admission to the group event based on a set of ranking data; a permission component 140 that permits a first subset of user profiles of the subset of candidate user profiles to subscribe to the group event based on a set of user preferences or rejects a second subset of user profiles of the subset of candidate user profiles to subscribe to the group event based on the set of user preferences; and a notification component 150 that provides a notification of a first user profile of the set of user profiles, wherein the notification represents a recommendation of a set of user profiles, and wherein the notification represents a recommendation of a set of group events.

In an aspect, creation component 110 can create a set of user profiles based on a set of user inputs, wherein the set of user inputs are received at a user interface. System 100 facilitates the organization of group events by users and in an instance the group event can be an athletic event such as a basketball game. As such each user can interact with system 100 and identify other users as candidates to participate in the group event or sporting event by accessing or providing user input. For instance, a user may desire to organize a basketball game and identify other players within a fifteen mile radius that are interested in playing the basketball game at a local park. Accordingly, the user can provide system 100 user inputs and system 100 can create a user profile based on such user inputs. Furthermore, the user can browse user profiles of potential candidates who may desire to play the pickup basketball game.

In an aspect, user input 106 can comprise various user information and user data such as a photograph, image, first name, last name, e-mail address, gender, phone number, sports preference, home city, or state. In another aspect, system 100 can be employed with a device such as a laptop computer, desktop computer, personal digital assistant (PDA), set-top box, mobile device, cellular device, or other such device. Furthermore, in an aspect, each device can comprise a user interface that receives user input 106, which system 100 employs to create a set of user profiles.

In another aspect, system 100 employs a generation component 120 that generates a group event comprising a subset of candidate user profiles of the set of user profiles based on a set of grouping criteria. A group event can comprise any activity governed by a set of rules including activities that involve physical exertion and are undertaken competitively. For example, a group event can be a sports event such as baseball, basketball, cycling, field hockey, football, soccer, cycling, ultimate frisbee, table tennis, squash, raquet ball, lacrosse, running, volleyball, golf, hockey, chess, swimming, and other such sporting events. In an aspect, a group event can comprise a group of users, each user can subscribe to participate in the group event based on their intent. Furthermore, the group event can be generated based on grouping criteria such as a set of rules and guidelines that describe the type of users sought for participation in the group event.

For instance, a group event can seek subscription by users based on grouping criteria such as a minimum skill level (e.g., athletic ability, positional competency, intellectual capability, etc.) required by each user profile, a maximum skill level permitted to each user profile, a proximity of each user profile to the group event, an environment associated with the group event, an equipment requirement associated with the group event, a set of rules associated with the group event, a set of required attire associated with the group event, or a subscription fee associated with the group event. In another aspect, the grouping criteria can contribute to the customization of the group event. Thus a group event can be associated with defined eligibility parameters for user profiles.

For example, a group event can allow subscription of user profiles located at a minimum within a one mile radius of the group event location or at a maximum within a thirty mile radius of the group event location. Furthermore, the location can be further limited by geographic boundaries (e.g., cities, towns, communities, etc.) and system 100 can employ geolocational features (e.g., global positioning software) to verify locational limitations of user profiles. In another non-limiting example, a group event can implement a policy that requires users (represented by user profiles) to own equipment or purchase equipment as a prerequisite to subscription to the group event. For instance, a hockey event may require users to own a hockey stick, ice skates, helmet with facemask and padding in order to attend the hockey match.

In another aspect, an event may require a particular attire such as wearing a team color or purchasing a team jersey in order to participate in the match. The game event can also abide by a customized set of rules (implemented by the event organizer or group of users). For instance, the rules of a football event may require a game duration of four quarters, fifteen minutes per quarter, two-hand touch (e.g., instead of tackle and flag football). Instead, a group event can limit its subscription to candidate user profiles or user profiles based on implemented guidelines, rules, and policies associated with the group event. In another aspect, a group event can be open to the public without any limitations as to which users can subscribe or user profiles based on implemented guidelines, rules, and policies associated with the group event. In another aspect, a group event can be open to the public without any limitations as to which users can subscribe.

In another aspect, system 100 can employ ranking component 130 that ranks each user profile of the set of user profiles candidacy for admission to the group event based on a set of ranking data. In an aspect, each group event can accommodate a group of user profiles from the candidate user profiles. The candidate user profiles are determined based on the grouping criteria. In order to identify the user profiles of the candidate user profiles that may be best suited for admission to the group event, system 100 employs ranking component 130, which ranks each user profile of the subset of candidate user profiles candidacy for admission to the group event based on a set of ranking data.

In an aspect, ranking data can represent a proximity of a third location corresponding to each user profile of the set of user profiles respectively as compared to a second location corresponding to the group event, a skill level of each user profile of the set of user profiles as compared to a roster position or an attendance reliability level. Generally, the ranking data can account for a set of meaningful metrics to indicate a candidate user profile that best fits the group criteria. For instance, if a user profile satisfies the criteria of having a location within a defined proximity of the group event, the user profile still may have a historical track record of failing to attend fifty percent of the game events for subscription. Thus, ranking component 130 may rank such user profile lower than other candidate user profiles with higher attendance rankings.

In an aspect, each group event can utilize different ranking data, ranking variables, and ranking criteria. As such, ranking component 130 can rank a subset of candidate user profiles in a particular order that is different than the rank order of the same subset of candidate user profiles in reference to a different group event. For instance, a group event to organize a golf outing may require candidate user profiles that are of an advanced skill level, have used or can access a particular golf venue, and are willing to pay the entrance fee for the golf course. Conversely, a group event for a pick-up basketball game may prioritize individuals athletic ability (e.g., height) and willingness to attend because there are at least ten people required to play in this particular basketball game. Therefore, ranking component 130 facilitates the interaction between user profiles and game events to achieve a successful event.

In another aspect, system 100 employs a permission component 140 that permits a first subset of user profiles of the subset of candidate user profiles to subscribe to the group event based on a set of user preferences or rejects a second subset of user profiles of the subset of candidate user profiles to subscribe to the group event based on the set of user preferences. System 100 employs permission component 140 to ultimately accept or reject a user profile to subscribe to a user event. The acceptance or rejection can be performed by system 100 (e.g., permission component 140) or manually by a user in accordance with a user preference.

The group event is generated (e.g., using generation component 120) by a user and such group event can be managed by a user. As such, the user can manually permit or reject each user subscribing to a group event for acceptance to the group event or specify user preferences to enable generation component 120 to permit or reject a users or candidate user profile's acceptance to the group event based on the user preferences. The user preferences can comprise the set of ranking data, the set of grouping criteria, a skill level of a user profile, a proximity of a first location corresponding to the first user profile as compared to a second location corresponding to the group event, historical information related to a user profile (e.g., attendance, behavior during gameplay), peer reviews or comments regarding a user profile, sporting preferences, positional preferences, athletic type preferences, or other such user preferences.

Thus, by employing permission component 140 and accounting for user preferences, system 100 can facilitate the subscription and acceptance of appropriate members to each group event. Furthermore, in an aspect, each user profile can specify user preferences such that system 100 can identify group events appropriate for the user profile. Accordingly, a user profile can specify what attributes of a group event are preferred, such as a team event, an event comprising players of a particular skill level, an event occurring in a particular region, a time period in which the event occurs, a specified duration of the event, and other such user preferences related to the group event.

In another aspect, system 100 can employ a notification component 150 that provides a notification to a first user profile of the set of user profiles, wherein the notification represents a recommendation of a set of user profiles, and wherein the notification represents a recommendation of a set of group events. In an aspect, notification component 150 can notify a user or a user profile as to when a group event arises that matches the users preferences or user criteria. Furthermore, the notification component 150 can provide recommendations to users as to group events that match the user preferences. In another aspect, notification component 150 can provide recommendations to the administrator (e.g., user profile) of the group event, as to the user profiles attempting to subscribe to a group event or as to recommendations of user profiles for acceptance or invitation to a group event. In an aspect, the notification can occur via a mobile device alert, vibration, noise, text message, e-mail alert or other such form of notification.

In an aspect, system 100 can be employed at a device such as a mobile device, tablet or computer. As such, system 100 can comprise a range of additional features that can be incorporated into a device. For instance, system 100 can present information at a display and such information can be presented as a splash or welcome screen. Also, each user can register and sign in via social media accounts, e-mail accounts, or other existing accounts. A user can create and manage information related to system 100 via the user profile. Furthermore, in an aspect, system 100 can present information at a panel (e.g., left pane, right pane of a user interface) as a slide menu to navigate system 100 features. In another aspect, a user can create and manage sporting events via system 100, such management can comprise managing event locations, event descriptions, weather details, recurring group events (e.g., sporting events), a user event log, groups, group activities, member subscriptions, group categories, managed events, joined events, event preferences, or skill level for group events.

In another aspect, system 100 can incorporate features that allow users to create private events (e.g., sending and accepting invites). Also, users can communicate with other users via group messaging, group commenting, group posting, and group displaying. Additionally, users can activate or deactivate various features including the notification option, group chatting, and event chatting. In another aspect, users will have the ability to invite friends or notify friends of various group events or user profiles for inclusion in a group event.

In yet another aspect, system 100, can include a feature to enable location based event searching to search nearby events. Furthermore, another feature can include a mobile application that provides maps (e.g., using global positioning based methods and software) to view all available or upcoming events, wherein such map can provide identifiers such as logos (e.g., team logo) and event names (e.g., via marker images). In another aspect, a user can view analytics information such as the distance of nearby events and address of each event. In another aspect, system 100 can integrate advertisements into displayed items such as group events or user profiles.

In yet another aspect, system 100 facilitates the sending of messages to users and user profiles to organize a group event or participate in a group event. Thus a user can invite others or coordinate (e.g., via message or event generation) a group event (e.g., athletic competition). Alternatively, a user can also search for group events. System 100 can comprise user-centered features such as providing a user a capability to subscribe to athletic events, such that upon availability of a group event related to the subscribed athletic events, a notification can be received (e.g., using notification component 150) by the user. For instance, a user can select to subscribe to soccer, football, basketball, and racquetball. As a soccer match, football scrimmage, basketball pick-up game, or racquetball court becomes available and satisfies the user preferences, a notification can be sent to the user of such event. Furthermore, in an aspect, system 100 can request all potentially interested user profiles in the area if they'd like to play the athletic event.

Figure 2:
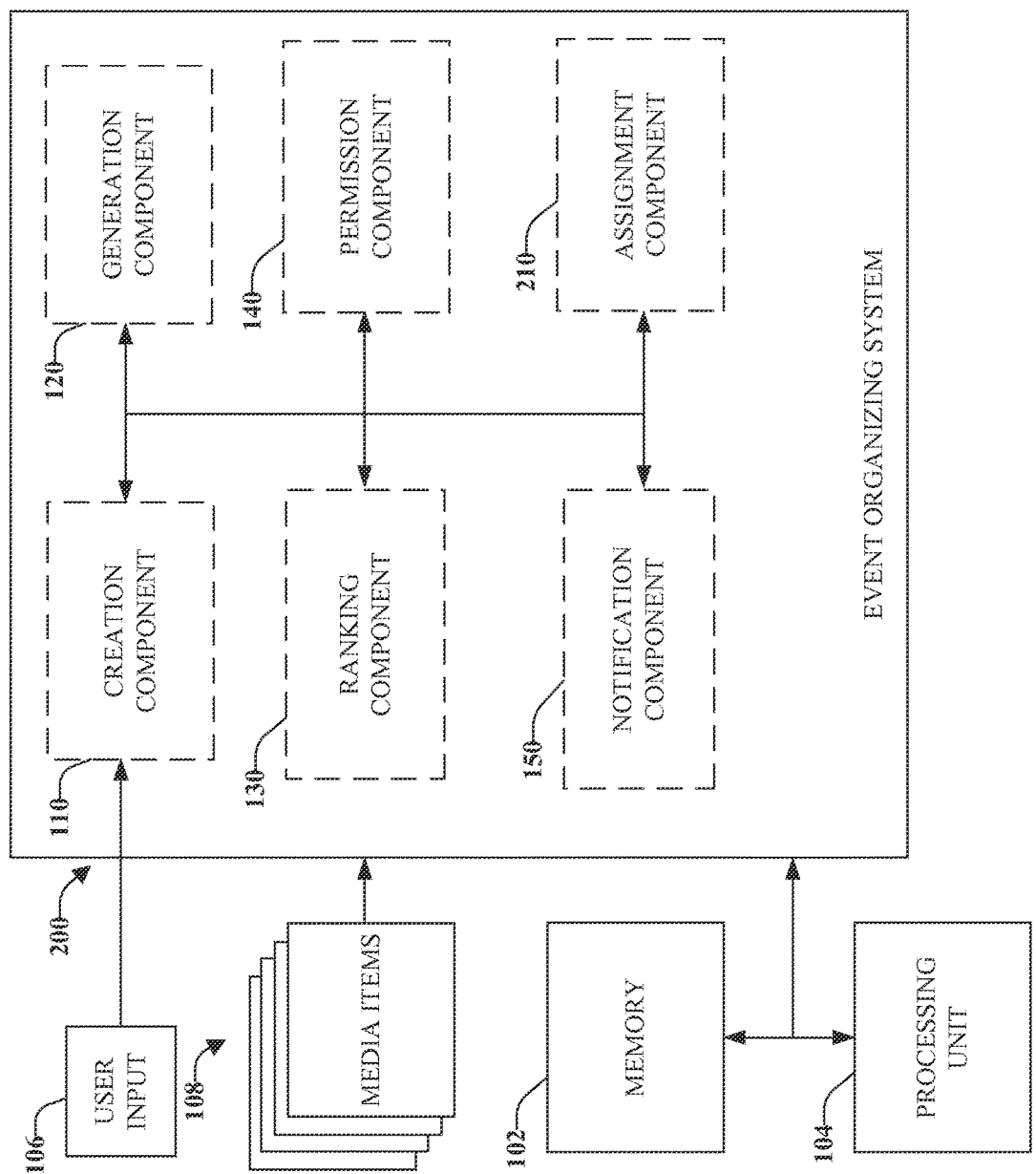
FIG. 2 illustrates another example non-limiting system for organizing user events and user groups.

Turning now to FIG. 2, illustrated is a non-limiting example of system 200 comprising the components of system 100 and further comprising assignment component 210. In an aspect, assignment component 210 facilitates a first user profile of the set of user profiles to assign a rating to a second user profile of the set of user profiles based on at least one of a skill level, a level of cooperative ability, a level of leadership ability, or a level of positional competency. In an aspect, system 200 allows for a user to rate another user based on various criteria such as a users athletic ability, attendance at games, and other such criteria. In an aspect, the assignment component facilitates peer reviews of each user. Furthermore, assignment component 210 also allows for the ability to assign a rating to the user or group event by the system 200 itself according to various rating criteria or rating data.

Figure 3:
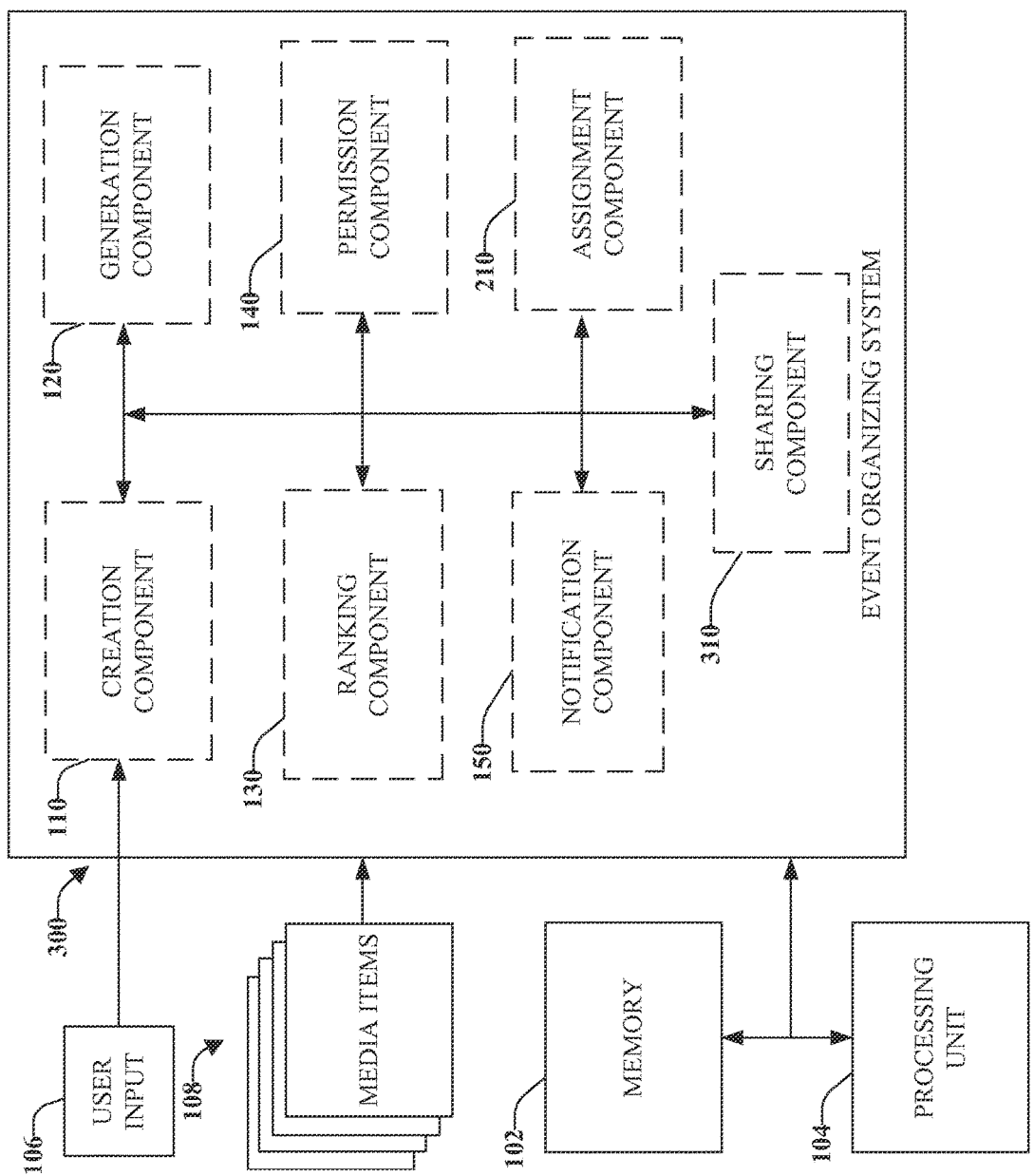
FIG. 3 illustrates another example non-limiting system for organizing user events and user groups.

Turning now to FIG. 3, illustrated is a non-limiting example of system 300 comprising the components of system 200 and further comprising a sharing component 310 that facilitates a user profile of the first subset of user profiles to share a set of media items comprising at least one of an image item, an audio item, or a video item. In an aspect, sharing component allows users to show media items 108 with one another to enhance the user experience and user interaction. Participating in group events can bring people into friendships and system 300 adds further functionality to facilitate sharing of other interest among group members such as video items, audio items, and images with one another.

Figure 4:
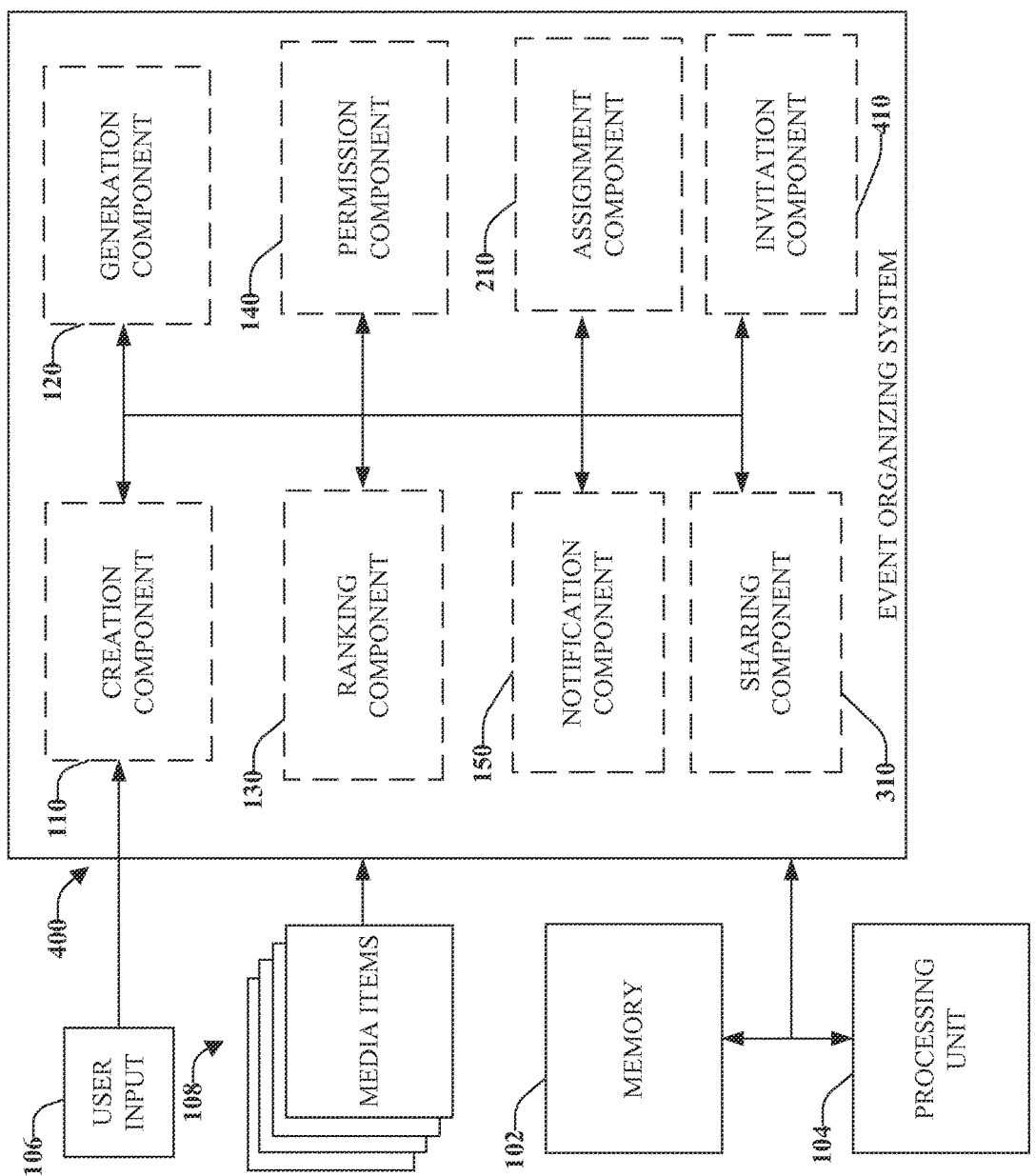
FIG. 4 illustrates another example non-limiting system for organizing user events and user groups.

Turning now to FIG. 4, illustrated is a non-limiting example of system 400 comprising the components of system 400 and further comprising an invitation component 410 that invites a user profile to join the group or the group event based on a user preference of the set of user preferences. In an aspect, system 400 facilitates the capability of users to invite other users to group events or to provide recommendations for users. Furthermore, in an aspect, invitation component 410 facilitates the invitation of other users to communicate with one another via group or private correspondences to facilitate the group organizing process and social interactions.

Figure 5:
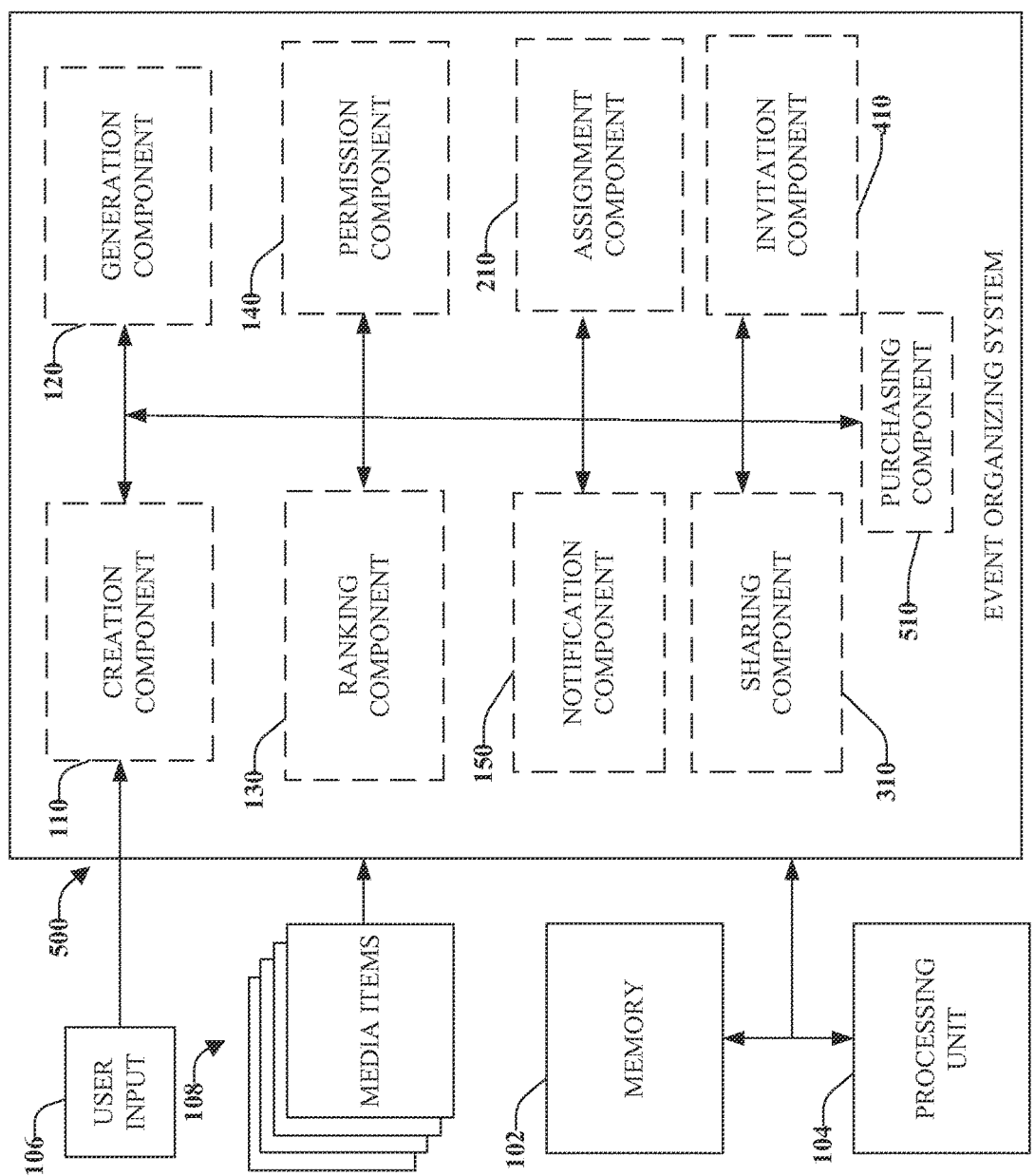
FIG. 5 illustrates another example non-limiting system for organizing user events and user groups.

Turning now to FIG. 5, illustrated is a non-limiting example of system 500 comprising the components of system 500 and further comprising a purchasing component 510 that facilities the purchase of a merchandise item comprising a sport-related service, a sporting event merchandise or a sport-related paraphernalia item based on a relevance of the merchandise item to the user profile. In an aspect, system 500 provides a purchasing component 510 that allows users to purchase merchandise relevant to a sporting event or group event. As such advertisers can present information to users based on a users preference or interests to facilitate purchases of various items including sports paraphernalia, professional sporting event items, and other such items.

In another non-limiting embodiment, system 500 can provide a feature that allows for an event creator or user profile to turn stats on or off. In addition, the event creator can have an option to appoint a Stat Master who maintains the player or user statistics and scoring. This Stat Master can be a spectator with a user profile. Additionally, system 500 allows for officiated events to be recorded in a user history.

Figure 6:
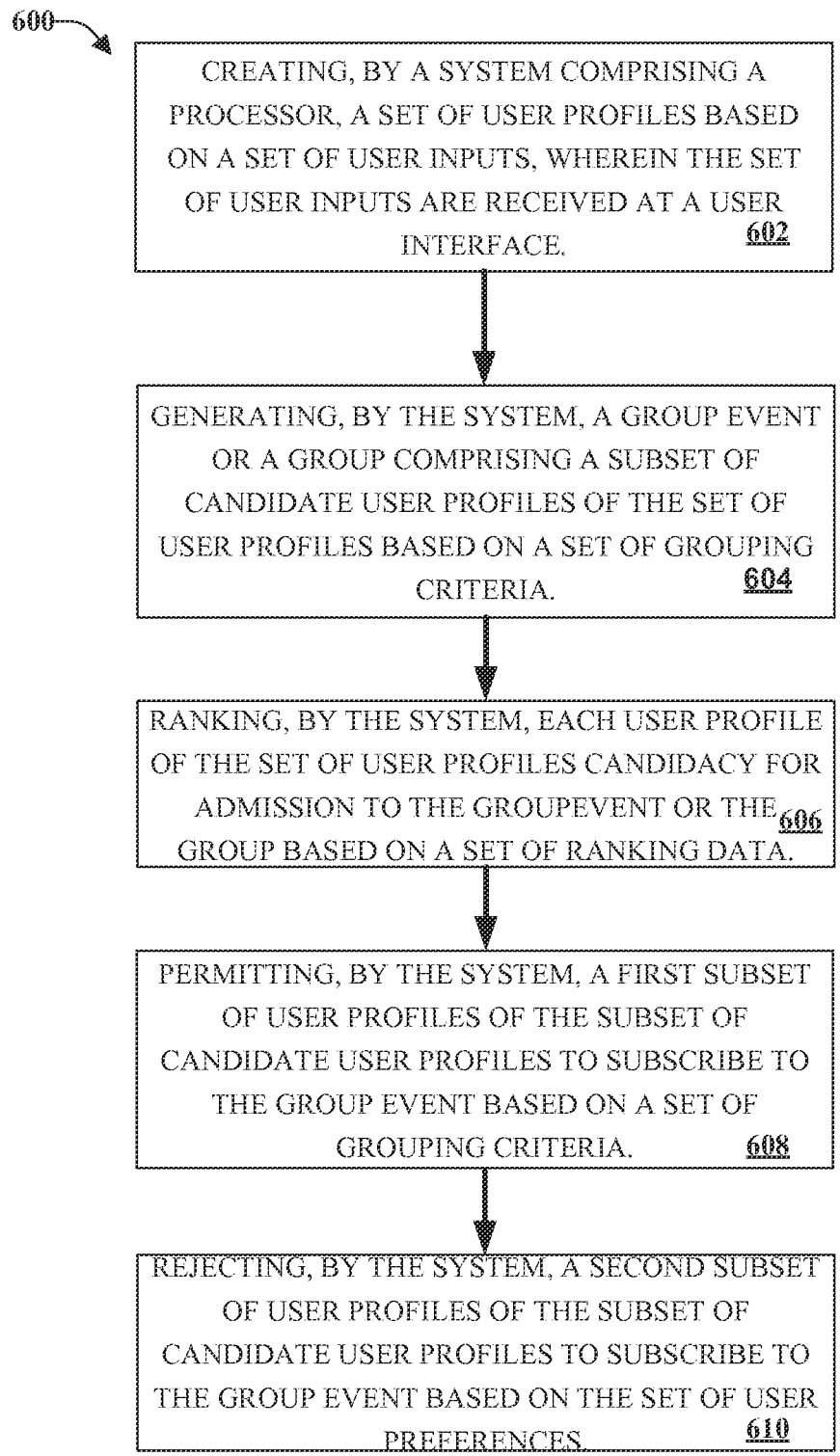
FIG. 6 illustrates an example non-limiting method for organizing user events and user groups.
Figure 7:
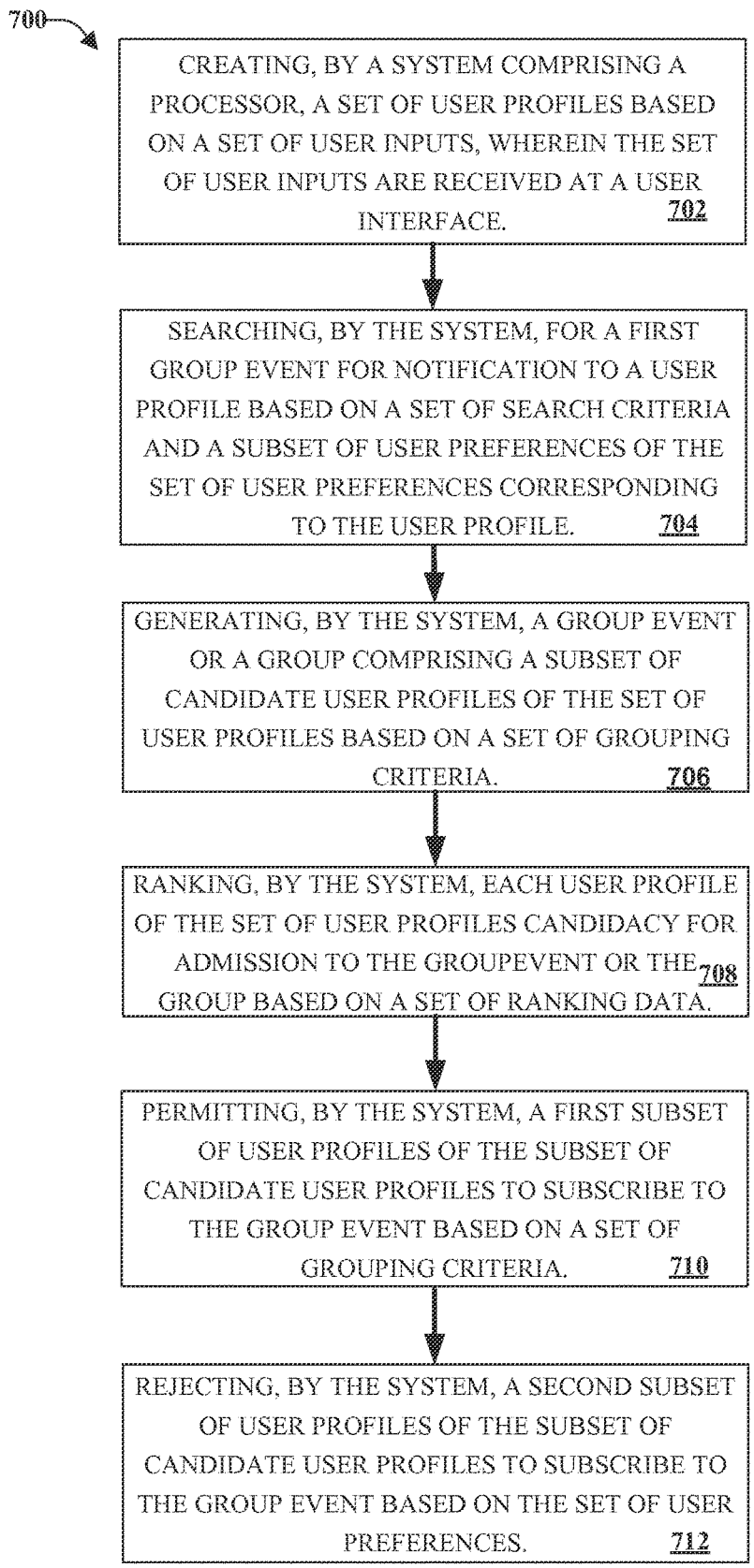
FIG. 7 illustrates another example non-limiting method for organizing user events and user groups.
Figure 8:
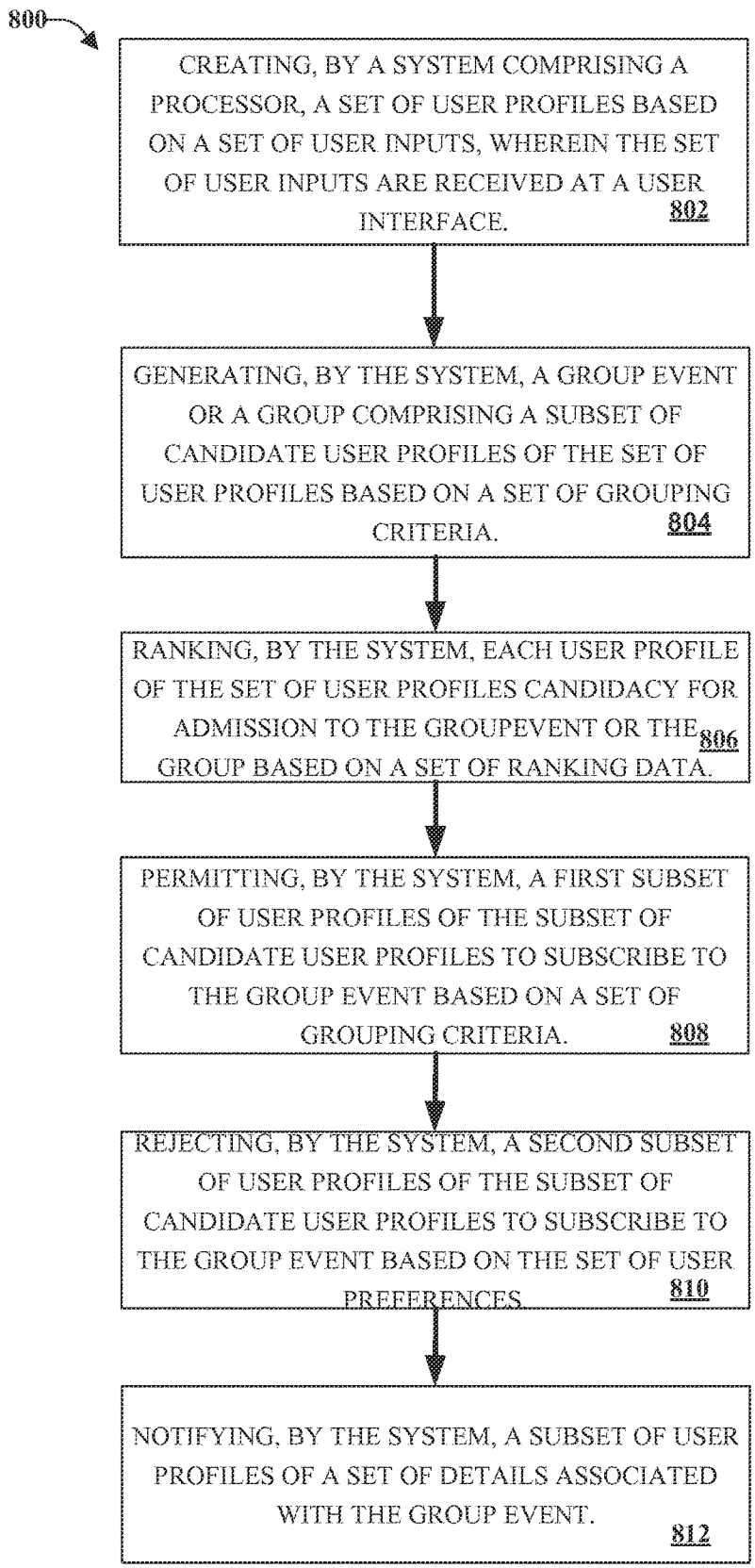
FIG. 8 illustrates another example non-limiting method for organizing user events and user groups.

Turning now to FIGS. 6-8, illustrated are methods or flow diagrams in accordance with certain aspects of this disclosure. While, for purposes of simplicity of explanation, the disclosed methods are shown and described as a series of acts, the disclosed subject matter is not limited by the order of acts, as some acts may occur in different orders and/or concurrently with other acts from that shown and described herein. For example, those skilled in the art will understand and appreciate that a method can alternatively be represented as a series of interrelated states or events, such as in a state diagram. Moreover, not all illustrated acts may be required to implement a method in accordance with the disclosed subject matter.

Referring now to FIG. 6, presented is a flow diagram of a non-limiting example of a method 600 to organize a group event. At 602, a set of user profiles are created, by a system including a processor, where the user profiles are based on a set of user inputs, wherein the set of user inputs are received at a user interface. At 604, a group event or a group comprising a subset of candidate user profiles of the set of user profiles are generated, by the system, based on a set of grouping criteria. At 606, the system ranks each user profile of the set of user profiles candidacy for admission to the group event or the group based on a set of ranking data. At 608, the system permits a first subset of user profiles of the subset of candidate user profiles to subscribe to the group event based on asset of grouping criteria. At 610, the system rejects a second subset of user profiles of the subset of candidate user profiles to subscribe to the group event based on the set of user preferences.

Referring now to FIG. 7 presented is a flow diagram of a non-limiting example of a method 700 to organize a group event. At 702, a set of user profiles are created, by a system including a processor, where the user profiles are based on a set of user inputs, wherein the set of user inputs are received at a user interface. At 704, the system searches for a first group event for notification to a user profile based on a set of search criteria and a subset of user preferences of the set of user preferences corresponding to the user profile. At 706, a group event or a group comprising a subset of candidate user profiles of the set of user profiles are generated, by the system, based on a set of grouping criteria. At 708, the system ranks each user profile of the set of user profiles candidacy for admission to the group event or the group based on a set of ranking data. At 710, the system permits, a first subset of user profiles of the subset of candidate user profiles to subscribe to the group event based on asset of grouping criteria. At 712, the system rejects a second subset of user profiles of the subset of candidate user profiles to subscribe to the group event based on the set of user preferences.

Referring now to FIG. 8, presented is a flow diagram of a non-limiting example of a method 800 to organize a group event. At 802, a set of user profiles are created, by a system including a processor, where the user profiles are based on a set of user inputs, wherein the set of user inputs are received at a user interface. At 804, a group event or a group comprising a subset of candidate user profiles of the set of user profiles are generated, by the system, based on a set of grouping criteria. At 806, the system ranks each user profile of the set of user profiles candidacy for admission to the group event or the group based on a set of ranking data. At 808, the system permits a first subset of user profiles of the subset of candidate user profiles to subscribe to the group event based on asset of grouping criteria. At 810, the system rejects a second subset of user profiles of the subset of candidate user profiles to subscribe to the group event based on the set of user preferences. At 812, the system notifies, a subset of user profiles of a set of details associated with the group event.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 9:
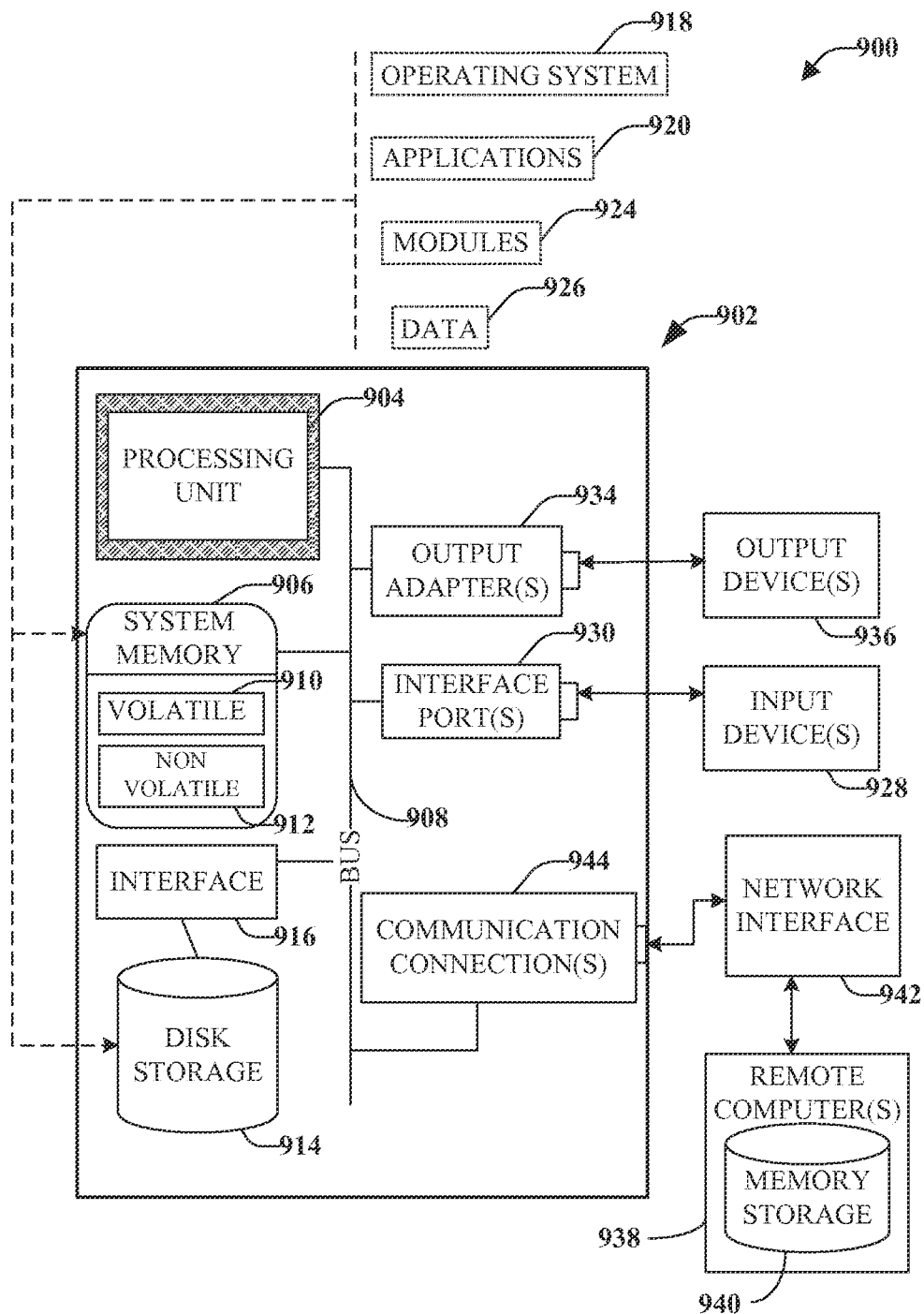
FIG. 9 illustrates a block diagram representing an exemplary non-limiting networked environment in which the various embodiments can be implemented.

With reference to FIG. 9, a suitable environment 900 for implementing various aspects of the claimed subject matter includes a computer 902. The computer 902 includes a processing unit 904, a system memory 906, a codec 905, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to various embodiments, codec 905 may include at least one of an encoder or decoder, wherein the at least one of an encoder or decoder may consist of hardware, a combination of hardware and software, or software. Although, codec 905 is depicted as a separate component, codec 905 may be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, Jaz drive, Zip drive, LS-70 drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916.

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by the operating system through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902, and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
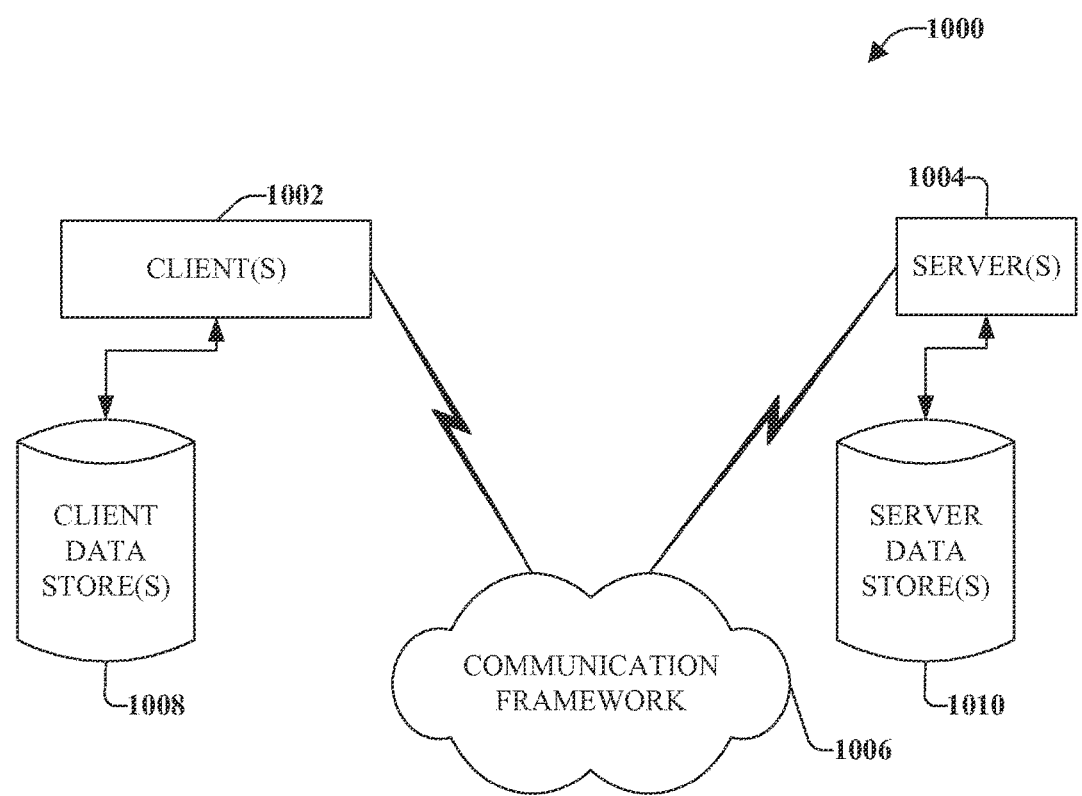
FIG. 10 is a block diagram representing an exemplary non-limiting computing system or operating environment in which the various embodiments may be implemented.

Referring now to FIG. 10, there is illustrated a schematic block diagram of a computing environment 1000 in accordance with this disclosure. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a metadata, such as associated contextual information for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 include or are operatively connected to one or more client data store(s) 1008 that can be employed to store information local to the client(s) 1002 (e.g., associated contextual information). Similarly, the server(s) 1004 are operatively include or are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the various embodiments. Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the various embodiments are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the various embodiments include a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the various embodiments may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
   a memory that stores executable components; and
   a processor, coupled to the memory, that executes or facilitates execution of the executable components, the executable components comprising:
   a creation component that creates, by an application executing on a first device, a set of user profile data based on a set of user input data, wherein the set of user input data are received at a user interface of the first device;
   a generation component that generates, by the application executing on the device, a group event comprising a subset of candidate user profile data of the set of user profile data based on a set of grouping criteria;
   a ranking component that determines a ranking, by the application executing on the device, of one or more user profile data of the subset of candidate user profile data candidacy for admission to the group event based on a set of ranking data representing a best fit between the one or more user profile data and the set of grouping criteria, wherein the set of ranking data comprises a first subset of ranking data representing a proximity of a third location corresponding to at least one of one or more first devices corresponding to a first subset of user profile data of the subset of candidate user profile data as compared to a second location corresponding to a location of the group event;
   a permission component that permits, by the application executing on the device, the one or more first devices corresponding to the first subset of user profile data of the subset of candidate user profile data to subscribe to the group event based on a set of user preference data or rejects one or more second devices corresponding to a second subset of user profile data of the subset of candidate user profile data to subscribe to the group event based on the set of user preference data; and
   a notification component that transmits, by the application executing on the device, notification data to at least one of the one or more first devices, wherein the notification data represents a recommendation of a set of user profile data or a set of suggested group events.

2. The system of claim 1, wherein the generation component generates the notification data based on the set of user preference data, a skill level, or a proximity of a first location corresponding to the first device to a second location corresponding to a location of the group event.

3. The system of claim 2, wherein the notification data is transmitted based on an availability of the group event for enrollment.

4. The system of claim 3, wherein the set of grouping criteria comprises a minimum number of the one or more first devices permitted to subscribe to the group event, a maximum number of the one or more first devices permitted to subscribe to the group event, a maximum radial distance between the second location and the third location, or a minimum radial distance between the second location and the third location, or a maximum radial distance between the second location and the third location.

5. The system of claim 1, further comprising an assignment component that facilitates, by the application executing on the first device, an assignment of a rating to first user profile data of the subset of candidate user profile data based the grouping criteria comprising at least one of a skill level, a level of cooperative ability, a level of leadership ability, or a level of positional competency.

6. The system of claim 5, wherein the ranking component can further determine a ranking, by the application executing on the device, of one or more user profile data of the subset of candidate user profile data candidacy for admission to the group event based on a set of ranking data comprising a level of attendance corresponding to at least on of the one or more user profile data.

7. The system of claim 5, wherein the set of ranking data comprises a second subset of ranking data representing a roster position skill level corresponding to the subset of candidate user profile data, and wherein the set of ranking data further comprises a third subset of ranking data representing an attendance reliability level of the subset of candidate user profile data.

8. The system of claim 1, further comprising a sharing component that facilitates sharing, by the application executing on the first device, a set of media items comprising at least one of an image item an audio item, or a video item.

9. The system of claim 1, further comprising an invitation component that invites, by the application executing on the first device, one or more candidate user profile data of the subset of candidate user profile data to join the group event based on a user preference of the set of user preferences.

10. The system of claim 1, wherein the grouping criteria further comprises at least one of a proximity of the subset of candidate user profile data to the group event, an environment associated with the group event, an equipment requirement associated with the group event, a set of rules associated with the group event, a minimum skill level requirement, a maximum skill level permitted, a set of required attire, or a subscription fee requirement.

11. The system of claim 1, wherein the permission component permits, by the application executing on the device, the one or more first devices to the group event based on user input at the first device.

12. The system of claim 1, further comprising a purchasing component that facilitates, by the application executing on the device, the receipt of purchase data representing a purchase of a merchandise item, wherein the merchandise item comprises at least one of a sport-related service, a sporting event merchandise or a sport-related paraphernalia item.

13. The computer-implemented method comprising:
   creating, by a system comprising a processor, a set of user profile data based on a set of user input data, wherein the set of user input data are received at a user interface of a first device;
   generating, by the system, a group event comprising a subset of candidate user profile data of the set of user profile data based on a set of grouping criteria;
   ranking, by the system, candidate subsets of user profile data of the set of user profile data fitness for admission to the group event based on a set of ranking data, wherein the set of ranking data comprises a first subset of ranking data representing a proximity of a first location corresponding to at least one of one or more first devices corresponding to a user profile data of the subset of candidate user profile data as compared to a second location corresponding to a location of the group event;

permitting, by the system, a first subset of candidate user profile data of the set of user profile data to subscribe to the group event based on a set of grouping criteria; and rejecting, by the system, a second subset of candidate user profile data of the subset of candidate user profiles to subscribe to the group event based on a set of user preference data.

14. The computer-implemented method of claim 13, further comprising matching, by the system, the first subset of candidate user profile data to the group event, wherein the matching is based on a correlation between a subset of user input data or the set of user input data corresponding to the first subset of candidate user profile data and a subset of grouping criteria of the set of grouping criteria.

15. The computer-implemented method of claim 13, further comprising transmitting, by the system, a notification to one or more device corresponding to the subset of candidate user profile data subscribed to the group event.

16. The computer-implemented method of claim 13, further comprising searching, by the system, for a first group event based on a set of search criteria and a subset of user preference data of the set of user preference data.

* * * * *